(12) United States Patent
Kabasawa et al.

(10) Patent No.: US 7,909,901 B2
(45) Date of Patent: Mar. 22, 2011

(54) LIQUID CARTRIDGE

(75) Inventors: Yasunari Kabasawa, Hanno (JP);
Toshimi Kamitani, Fujioka (JP);
Kiyoshi Fujisawa, Fujioka (JP)

(73) Assignees: Casio Computer Co., Ltd., Tokyo (JP);
Mitsubishi Pencil Co., Ltd., Tokyo (JP)

( * ) Notice: Subject to any disclaimer, the term of this patent is extended or adjusted under 35 U.S.C. 154(b) by 267 days.

(21) Appl. No.: 12/225,319

(22) PCT Filed: Mar. 20, 2007

(86) PCT No.: PCT/JP2007/056526
§ 371 (c)(1),
(2), (4) Date: Sep. 18, 2008

(87) PCT Pub. No.: WO2007/119543
PCT Pub. Date: Oct. 25, 2007

(65) Prior Publication Data
US 2010/0230833 A1    Sep. 16, 2010

(30) Foreign Application Priority Data
Mar. 20, 2006  (JP) .................. 2006-077145

(51) Int. Cl.
*B01D 50/00* (2006.01)
(52) U.S. Cl. ......................... 55/385.1; 55/490
(58) Field of Classification Search ............... 55/385.1, 55/490; 429/34
See application file for complete search history.

(56) References Cited

U.S. PATENT DOCUMENTS
2006/0292420 A1 * 12/2006 Goto et al. .................. 429/34

FOREIGN PATENT DOCUMENTS

| | | |
|---|---|---|
| EP | 1 087 455 A2 | 3/2001 |
| JP | 2001-093551 A | 4/2001 |
| JP | 2004-142831 A | 5/2004 |
| WO | WO 2005/074065 A1 | 8/2005 |

* cited by examiner

*Primary Examiner* — Robert A Hopkins
(74) *Attorney, Agent, or Firm* — Holtz, Holtz, Goodman & Chick, PC

(57) ABSTRACT

A liquid cartridge includes a vessel body for containing liquid. The vessel body includes a plurality of surfaces. An oxygen outlet is provided on one surface among the plurality of surfaces of the vessel body. And an oxygen input is provided on a surface other than a furthest surface from the surface on which the oxygen outlet is provided among the plurality of surfaces of the vessel body.

9 Claims, 5 Drawing Sheets

LIQUID CARTRIDGE

This application is a U.S. National Phase Application under 35 USC 371 of International Application PCT/JP2007/056526 filed Mar. 20, 2007.

TECHNICAL FIELD

The present invention relates to a liquid cartridge which contains liquid.

BACKGROUND ART

Recently, small-size electronic devices such as cellular phones, notebook personal computers, digital cameras, watches, PDA (Personal Digital Assistance), electric personal organizers, and the like are making remarkable advances and progresses. Primary batteries such as alkaline battery and a manganese battery or secondary batteries such as a nickel-cadmium battery, a nickel metal hydride battery, and a lithium-ion battery are used as the power source of the electronic devices. However, when the primary batteries and the secondary batteries are investigated from a perspective of the use efficiency of energy, the batteries are not necessarily utilized effectively. Therefore, nowadays, the fuel cells which can realize high energy use efficiency to substitute them for the primary batteries and the secondary batteries, have been studied actively (for example, refer to JP2001-93551A and JP2004-142831A).

The fuel cell comprises a fuel cell body in which the electrolyte plate is held between the fuel electrode and the oxygen electrode and a liquid cartridge which contains the liquid mixture of liquid fuel such as methanol or the like and water, and which is connected to the fuel cell body. When the liquid cartridge is emptied, the liquid cartridge can be replaced by the new cartridge. Further, there are various types of liquid cartridges, and as disclosed in JP2004-142831A, there is a liquid cartridge which comprises a residual measurement function.

Preferably, the above described liquid cartridge has a larger volume ratio of liquid which is contained inside with respect to the total volume. However, when a new function is added to the liquid cartridge, a new construction needs to be added. Therefore, a problem in which the amount of contained liquid becomes smaller accordingly is caused.

The object of the present invention is to suppress the decreasing of the liquid containing ratio with respect to the entire liquid cartridge.

DISCLOSURE OF THE INVENTION

According to one aspect of the present invention, a liquid cartridge comprises
 a vessel body for containing liquid, the vessel body comprising a plurality of surfaces,
 an oxygen outlet provided on one surface among the plurality of surfaces of the vessel body, and
 an oxygen input provided on a surface other than a furthest surface from the surface on which the oxygen outlet is formed among the plurality of surfaces of the vessel body is provided.

PREFERRED EMBODIMENT FOR CARRYING OUT THE INVENTION

Figure 1:
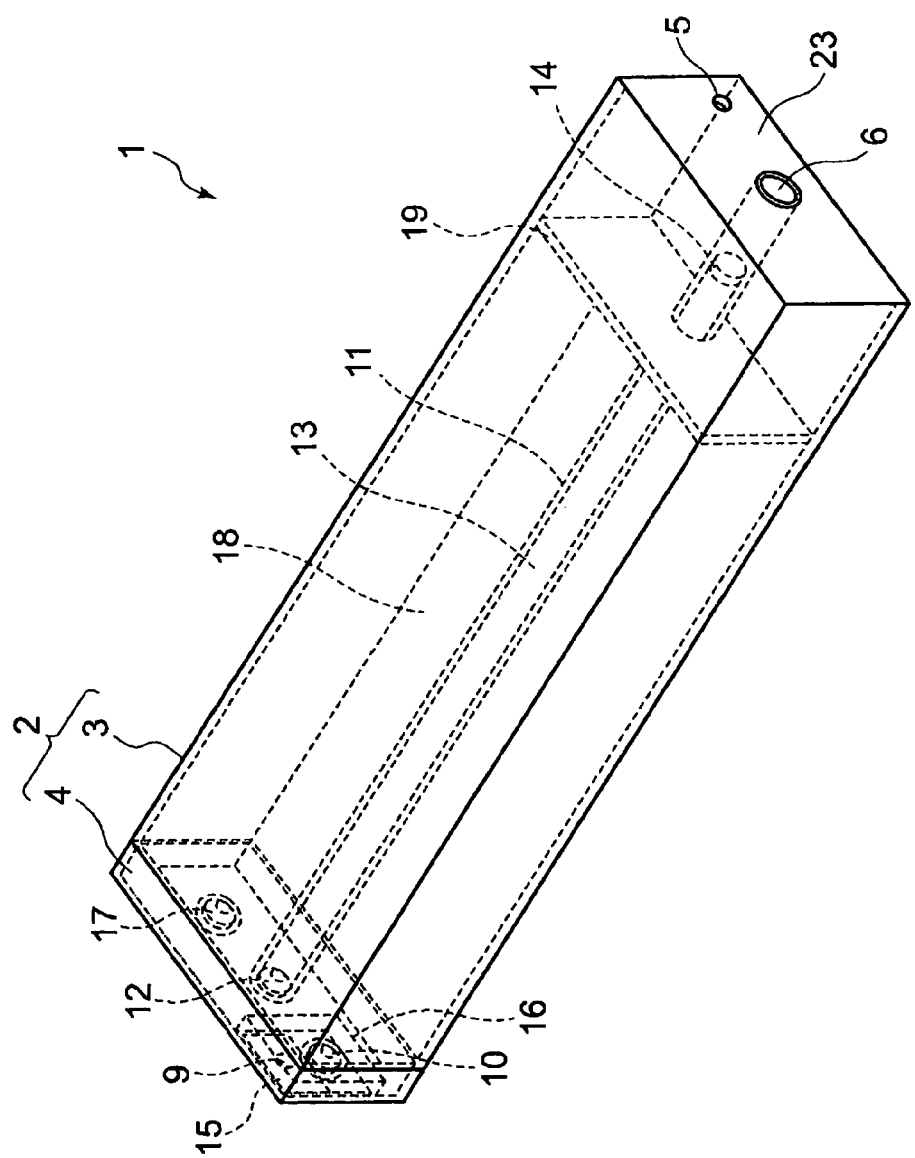
FIG. 1 is a perspective view of the liquid fuel cartridge.

The preferred embodiment for carrying out the present invention will be described below with reference to the drawings. In the embodiment described below, various technically preferable limitations are added to carry out the present invention. However, the scope of the invention is not limited to the embodiment described below and the examples shown in the drawings.

Figure 2:
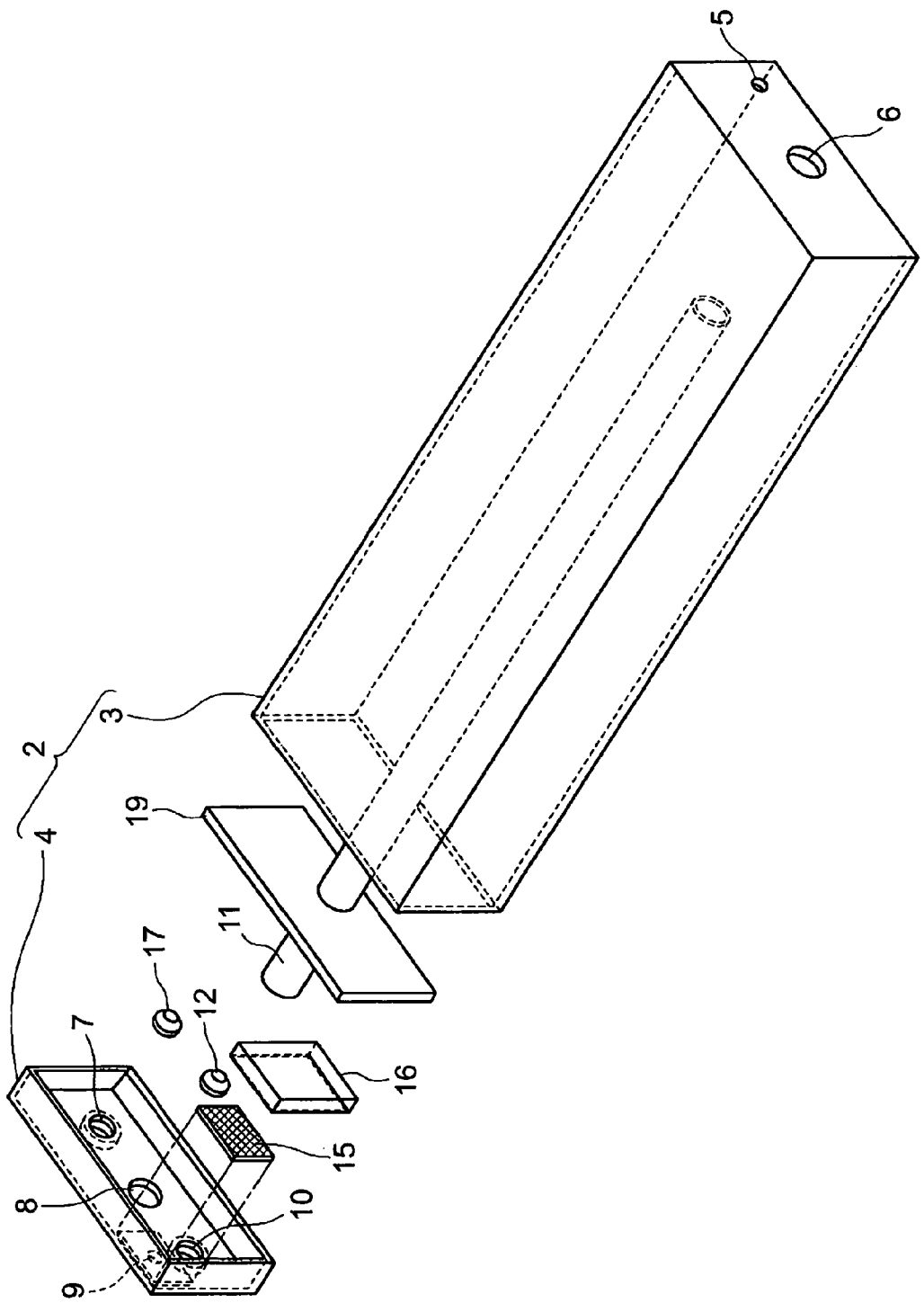
FIG. 2 is an exploded perspective view when seen from the same direction as FIG. 1.
Figure 3:
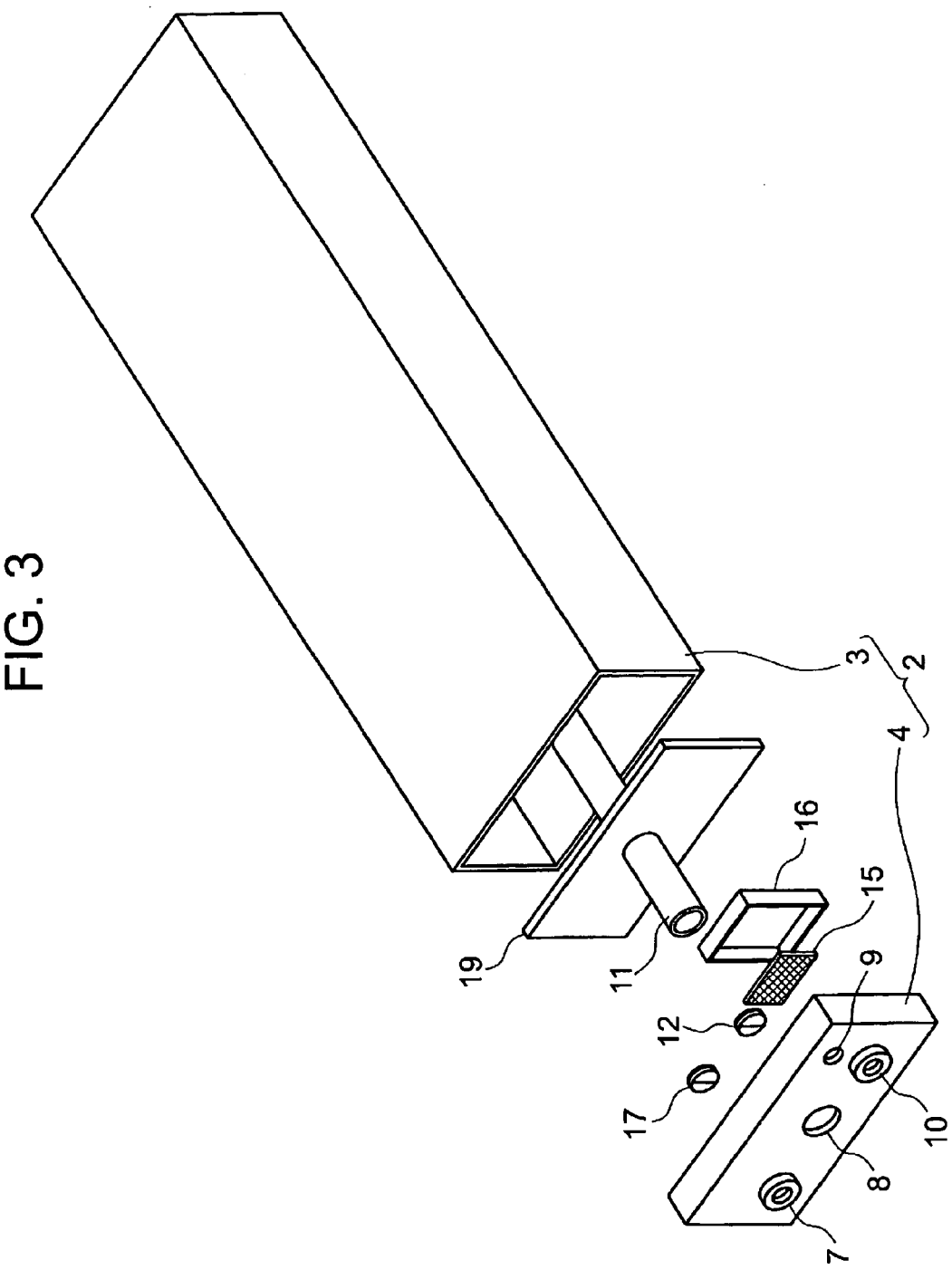
FIG. 3 is an exploded perspective view when seen from a different direction from FIG. 2.
Figure 4:
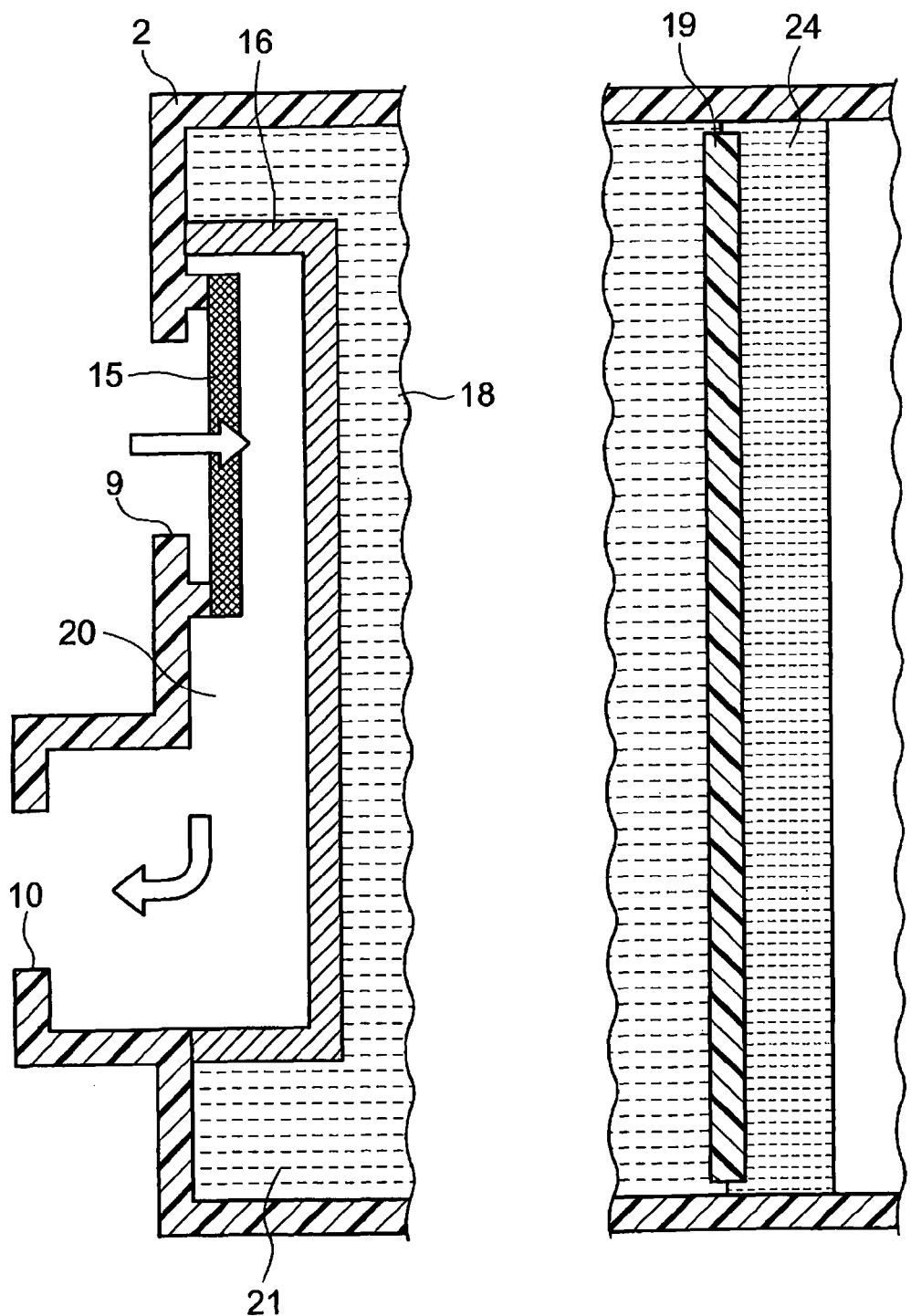
FIG. 4 is an end view of a longitudinal sectional surface along the center line of the oxygen inlet.

FIG. 1 is a perspective view showing the top, the back, and the left side of the liquid fuel cartridge 1, FIG. 2 is an exploded perspective view when seen from the same direction as FIG. 1, FIG. 3 is an exploded perspective view showing the top, the front, and the left side, and FIG. 4 is an end view showing a longitudinal sectional surface cut across the oxygen inlet 9 seen from the left.

As shown in FIGS. 1 to 4, a vessel body 2 of the liquid fuel cartridge 1 is a rectangular box which has a front surface, a back surface, an upper surface, a lower surface, a right surface, and a left surface. An internal space of the vessel body 2 is also formed in a rectangular shape. The vessel body 2 comprises a rectangular box-shaped package 3 in which the front surface is opened and a rectangular box-shaped lid member 4 in which the back surface is opened. The vessel body 2 is assembled by engaging the lid member 4 with the package 3 so that the front opening of the package 3 and the back opening of the lid member 4 face each other.

Pressure regulating holes 5 and 6 are formed to penetrate the back surface 23 of the vessel body 2. Inside of the vessel body 2 communicates with outside of the vessel body 2 through the pressure regulating holes 5 and 6. On the other hand, a fuel outlet 7, a water outlet 8, an oxygen inlet 9, and an oxygen outlet 10 are formed on the front surface of the vessel body 2. On the front surface of the vessel body 2, peripheries of the fuel outlet 7 and the oxygen outlet 10 are projected. The fuel outlet 7 is formed in a position facing the pressure regulating hole 5, the water outlet 8 is formed in a position facing the pressure regulating hole 6, and the oxygen inlet 9 is formed above the oxygen outlet 10.

The oxygen inlet 9 is a port for introducing gas which includes oxygen as an oxidizing agent, and gas which includes oxygen such as air or the like can be introduced besides the oxygen simplex. The oxygen inlet 9 is blocked from inside by an air filter 15. Dusts which are included in the air (oxygen) passing the oxygen inlet 9 are captured by the air filter 15. The air filter 15 can be provided outside, and the oxygen inlet 9 can be blocked from outside by the air filter 15. The oxygen outlet 10 is a port for discharging the gas including oxygen, which is introduced from the oxygen inlet 9 through the air filter 15. The oxygen outlet 10 can discharge gas which includes oxygen such as air or the like besides the oxygen simplex.

A check valve 17 is inserted to the fuel outlet 7. The check valve 17 is a duckbill valve in which a material having flexibility/elasticity (for example, an elastomer) is formed in a duckbill-shape. The check valve 17 is inserted in the oxygen inlet 9 in a state where the duckbill-shaped tip faces toward inside the vessel body 2. Liquid is inhibited from flowing towards outside from inside of the vessel body 2 by the check valve 17.

A water containing pipe 11 is disposed inside the vessel body 2. The water containing pipe 11 is supported by being engaged with the pressure regulating hole 6 and the water outlet 8. In such way, the water containing pipe 11 is bridged between the front surface and the back surface of the vessel body 2, and the water containing pipe 11 is provided to be parallel to the upper surface, the lower surface, the left surface, and the right surface of the vessel body 2. A rear end of the water containing pipe 11 is to be flush with the back surface of the vessel body 2, and a front-end section of the water containing pipe 11 projects outside further than the front surface of the vessel body 2.

A check valve 12 is inserted to the front-end of the water containing pipe 11. The check valve 12 is a duckbill valve in which a material having flexibility/elasticity (for example, an elastomer) is formed in a duckbill-shape. The check valve 12 is inserted in the water containing pipe 11 in a state where the duckbill-shaped tip faces toward the rear end of the water containing pipe 11. Liquid is inhibited from flowing toward outside from inside of the water containing pipe 11 by the check valve 12.

A follower body 14 is contained in the middle between the front-end and the rear-end of the water containing pipe 11. The rear-end side region and the front-end side region of an internal space of the water containing pipe 11 are partitioned by the follower body 14. The front-end side region which is one of the two regions partitioned by the follower body 14 is filled with the liquid water 13. The follower body 14 is liquid such as sol, gel, or the like having low affinity on water 13. Further, preferably, the follower body 14 is highly viscous liquid in which the viscosity is higher than the water 13 and which is insoluble in water 13. Moreover, the follower body 14 is preferably a structured viscous fluid (abnormal viscous fluid) having the property in which the apparent viscosity decreases when the share rate increases. Particularly, such as Polybutene, liquid paraffin, spindle oil, other types of mineral oil, dimethyl silicon oil, methylphenyl silicon oil, other types of silicon oil, and combinations of the above can be used as the follower body 14.

A partition 16 is disposed inside the vessel body 2. The partition 16 is formed in a rectangular box-shape in which the front surface is opened. The front opening of the partition 16 faces the back of the front surface of the vessel body 2, the oxygen inlet 9 and the oxygen outlet 10 are covered with the partition 16, and the partition 16 is attached to the back of the front surface of the vessel body 2. The space inside of the vessel body 2 is divided into the oxygen flowing space 20 which is enclosed by the partition 16 and the lid member 4 and the liquid fuel containing space 21 which is enclosed by the partition 16, the package 3, and the lid member 4. Because the oxygen inlet 9 and the oxygen outlet 10 are covered with the partition 16, outside of the vessel body 2 communicates with the oxygen flowing space 20 through the oxygen inlet 9 and the oxygen outlet 10.

A follower partition plate 19 is housed in the liquid fuel containing space 21. A penetration hole penetrates the center of the follower partition plate 19 and the water containing pipe 11 is inserted to the penetration hole. The follower partition plate 19 is disposed so as to move along the water containing pipe 11 maintaining a parallel position to the front surface and the back surface of the vessel body 2. The liquid fuel containing space 21 is divided into the fuel outlet 7 side region and the pressure regulating hole 5 side region by the follower partition plate 19. The fuel outlet 7 side region which is one of the two regions partitioned by the follower partition plate 19 is filled with the liquid fuel 18. The liquid fuel 18 is, for example, methanol, ethanol, dimethylether, or liquid mixture of the above.

The follower body 24 is applied to the follower partition plate 19 on the surface which is opposite to the back surface 23 of the vessel body 2, the follower body 24 is injected to a minor gap between the follower partition plate 19 and the vessel body 2 and a minor gap between the follower partition plate 19 and the water containing pipe 11, and the follower body 24 functions as a lubricant. The follower body 24 and the follower partition plate 19 move together so that the above described state is maintained even when the follower partition plate 19 moves along the water containing pipe 11. The follower body 24 applied to the follower partition plate 19 is a liquid such as sol, gel, or the like having low affinity on the liquid fuel 18. Further, preferably, the follower body 24 is highly viscous liquid in which the viscosity is higher than the liquid fuel 18 and which is insoluble in the liquid fuel 18. Moreover, the follower body 24 is preferably a structured viscous fluid (abnormal viscous fluid) having the property in which the apparent stress decreases when the share stress (or the share rate) increases. Particularly, such as Polybutene, liquid paraffin, spindle oil, other types of mineral oil, dimethyl silicon oil, methylphenyl silicon oil, other types of silicon oil, and combinations of the above can be used.

The water 13 and the liquid fuel 18 are provided to the device by connecting the liquid fuel cartridge 1 to the device. When the liquid fuel cartridge 1 is connected to the device, three engaging units are formed at the section of the device, which is opposed to the front surface of the vessel body 2, and a projected periphery of the fuel outlet 7, a projected periphery of the water outlet 8, and a front-end of the water containing pipe 11 are inserted to the engaging units, respectively.

A pipe is provided at the engaging unit which engages with the fuel outlet 7. When the projected periphery of the fuel outlet 7 is inserted to the engaging unit, the pipe is inserted to the check valve 17 and the check valve 17 is made to be in an opened state by the pipe. The liquid-sending pump connected to the pipe is provided to the device, the liquid fuel 18 contained in the vessel body 2 is aspired by the liquid-sending pump to be sent in the device. When the liquid fuel 18 is discharged from the vessel body 2, volume of the liquid fuel 18 contained in the vessel body 2 decreases. The decrease in volume of the liquid fuel 18 is accompanied by the position of the end interface of the liquid fuel 18 moving so as to gradually approach toward the fuel outlet 7 side. Then, the follower body 24 and the follower partition plate 19 positioned at the end interface of the liquid fuel 18 move towards the front surface of the vessel body 2 so as to adjust them to the position of the end interface of the liquid fuel 18. A sealed state of the liquid fuel 18 is maintained by the liquid fuel 18 abutting on the follower partition plate 19.

A pipe is provided at the engaging unit which engages with the projected periphery of the water outlet 8. When the projected periphery of the water outlet 8 is inserted to the engaging unit, the pipe is inserted to the check valve 12 and the check valve 12 is made to be in an opened state by the pipe. The liquid-sending pump connected to the pipe is provided to the device, water 13 contained in the water containing pipe 11 is aspired by the liquid-sending pump to be sent in the device. The decrease of water 13 is accompanied by the follower body 14 moving towards the front-end of the water containing pipe 11 similarly to the movement of the follower body 24. A sealed state of the liquid fuel 18 is maintained by the water 13 abutting on the follower body 14.

When the liquid fuel cartridge 1 is connected to the device, an oxygen port is formed at the section of the device, which is opposed to the front surface of the vessel body 2, and the oxygen port is connected to the oxygen inlet 9. The device is provided with an air pump (fan) which is connected to the oxygen port, outside air (oxygen) is aspired by the air pump, and the aspired air is sent to the oxygen inlet 9 through the oxygen port. The air sent to the oxygen inlet 9 passes the air filter 15, and the air is cleaned by capturing the dusts included in the air with the air filter 15. The air which is cleaned by the air filter 15 flows through the oxygen flowing space 20, and is sent in the device through the oxygen outlet 10.

When keep using the above described liquid fuel cartridge 1, the total amount of air which passed through the air filter 15 increases and the air filter 15 becomes clogged with the dusts. Because the air filter 15 is provided to the liquid fuel cartridge 1, the air filter 15 can be replaced safely and easily together with the liquid fuel cartridge 1 when the liquid fuel cartridge 1 is replaced. Therefore, a user does not need to judge the replacing timing of the air filter 15 or remember the replacing timing. Thus, a user does not have to be conscious about the timing to replace the air filter 15 and the burden of the user can be reduced.

Further, as shown in the formulas (3) and (5) which are described below, the amount of oxygen used in the CO remover and the fuel cell is stoichiometric with respect to the amount of the liquid fuel 18 and the like, and can be calculated for the most part by the system design. The amount of oxygen taken in from the oxygen inlet 9 can be set from the abundance ratio of the oxygen included in the air. Therefore, the amount of air passing through the air filter 15 can be estimated from the amount of the liquid fuel 18 which fills the one liquid fuel cartridge 1. The air filter 15 needs the dust accumulating capacity according to the air amount and excessive dust accumulating capacity is not needed. Therefore, the air filter 15 can be downsized. In such way, because the air filter 15 equipped to the liquid fuel cartridge 1 only needs to collect dusts according to the air which is used by the time the liquid fuel 18 contained in the liquid fuel cartridge 1 is consumed, a high dust accumulating capacity is not required for a long time. Thus, mesh of the air filter 15 can be made to be rough and air can be sent efficiently without putting excessive load on the air pump.

When the oxygen outlet 10 is disposed on the lid member 4 which is the front surface of the vessel body 2 and the air filter 15 is disposed on the back surface 23 of the vessel body 2 facing to the lid member 4, an oxygen flowing space 20 having a large volume is formed between the lid member 4 and the back surface 23, and the containing amount of the liquid fuel 18 becomes small. However, because the oxygen inlet 9 and the oxygen outlet 10 are formed on the same front surface of the vessel body 2 of the liquid fuel cartridge 1 in the embodiment, the oxygen introducing nozzle 9 and the oxygen outlet 10 can be formed in proximity to each other and the size of the partition 16 can be made smaller. Further, the capacity of the oxygen flowing space 20 can be kept at minimal capacity and the occupying ratio of the liquid fuel containing space 21 can be made larger with respect to the vessel body 2. Therefore, the containing amount of the liquid fuel 18 can be made larger. The effects described above can be obtained when the air filter 15 is disposed at the furthest position from the oxygen outlet 10, that is, the positions other than the back surface 23, for example, at a position such as side surfaces of the package 3.

When the air filter 15 is provided so as to divide the oxygen flowing space 20 into the oxygen inlet 9 side and the oxygen outlet 10 side, the air filter 15 can be provided anywhere as long as the air filter 15 is provided at a position where the force of aspiration of the pump inside of the oxygen flowing space 20 is not considerably impaired. Moreover, the oxygen outlet 10 can be blocked by the air filter 15 from inside, or the oxygen outlet 10 can be blocked by the air filter 15 from outside.

Figure 5:
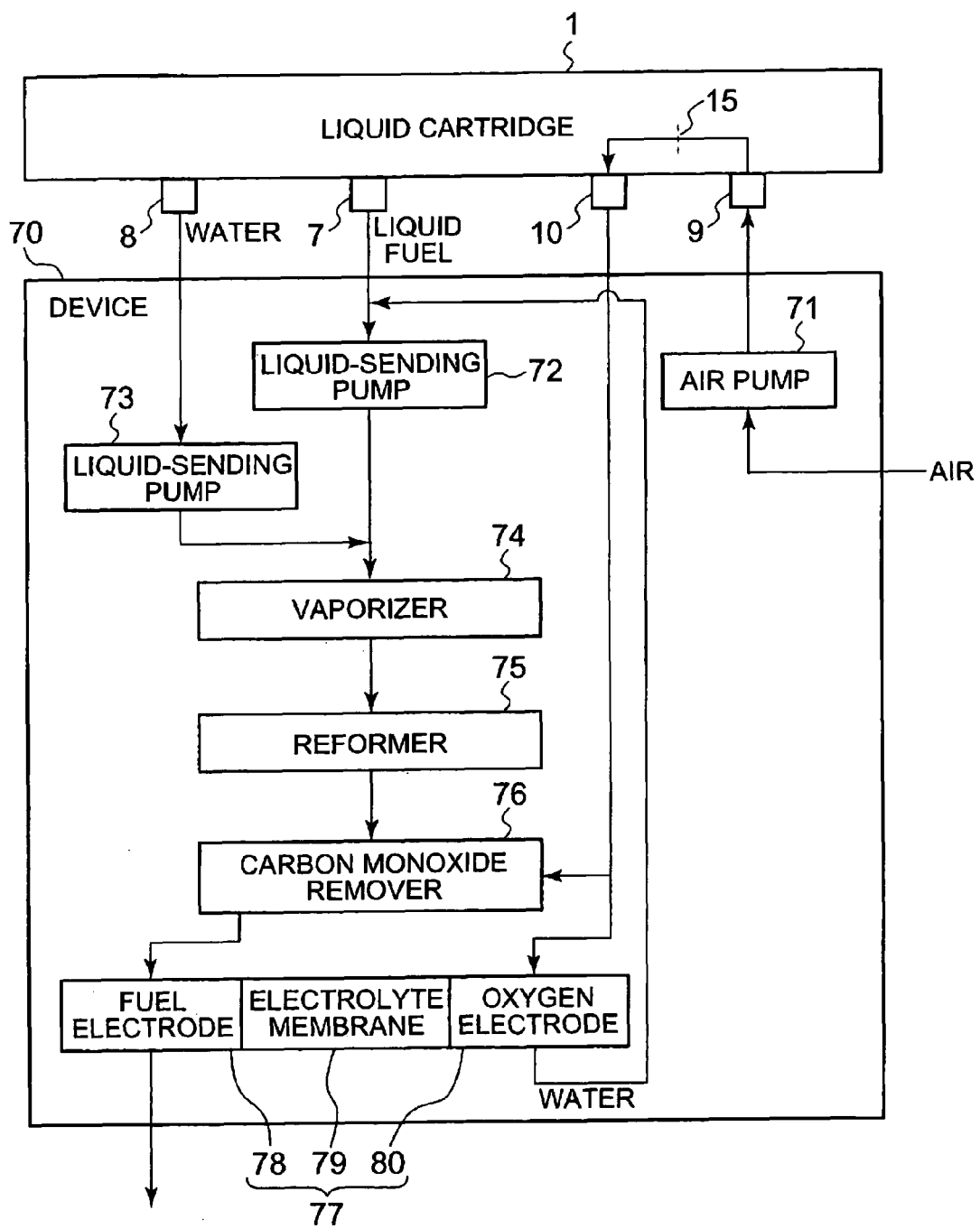
FIG. 5 is a block diagram showing an example of a device which is connected to the liquid fuel cartridge of FIG. 1.

FIG. 5 is a block diagram showing an example of the device which is connected to the liquid fuel cartridge 1. As shown in FIG. 5, the device 70 comprises an air pump 71, a liquid-sending pump 72, a liquid-sending pump 73, a vaporizer 74, a reformer 75, a carbon monoxide remover 76, a fuel cell 77, and a combustor 81.

Just before the electric power generating operation starts, the water 13 contained in the water containing pipe 11 is sent to the electrolyte membrane 79 of the fuel cell 77 by the liquid-sending pump 73 so as to become the carrier of ions which move inside of the electrolyte membrane 79. The heat of the electric heating material which is heated by the secondary battery (omitted from the drawing) applying voltage to the electric heating material is transmitted to the vaporizer 74, the reformer 75, and the carbon monoxide remover 76, and they are heated to a predetermined temperature, respectively. When the power generating operation is started, the liquid fuel 18 contained in the vessel body 2 is sent to the vaporizer 74 by the liquid-sending pump 72. The water 13 contained in the water containing pipe 11 is sent to the vaporizer 74 by the liquid-sending pump 73. The water and the liquid fuel are mixed in the vaporizer 74 and the liquid mixture is vaporized by the vaporizer 74. The gas mixture of the fuel and the water which is vaporized by the vaporizer 74 is sent to the reformer 75. In the reformer 75, hydrogen and carbon dioxide are generated by catalysis from the gas mixture provided from the vaporizer 74. The gas mixture generated in the reformer 75 is provided to the carbon monoxide remover 76. When the liquid fuel 18 contained in the vessel body 2 is methanol, catalytic reactions as expressed by reaction formulas (1) and (2) occur in the reformer 75.

$$CH_3OH + H_2O \rightarrow 3H_2 + CO_2 \tag{1}$$

$$H_2 + CO_2 \rightarrow H_2O + CO \tag{2}$$

The gas mixture generated in the reformer 75 is provided to the carbon monoxide remover 76.

The gas mixture is provided to the carbon monoxide remover 76 from the reformer 75. On the other hand, the air pump 71 makes the air pass through the oxygen inlet 9, the air filter 15, and the oxygen outlet 10 of the liquid fuel cartridge 1, in this order, and then the air is provided to the carbon monoxide remover 76. In the carbon monoxide remover 76, the gas mixture which is sent from the reformer 75 and the air (oxygen) in which dusts are removed by the air pump 71 are mixed. Moreover, in the carbon monoxide remover 76, the carbon monoxide gas in the gas mixture is preferentially oxidized (combustion) by catalysis as shown in the reaction formula (3) to remove the carbon monoxide. Hydrogen gas is included in the gas mixture in a state where the carbon monoxide is removed, and the gas mixture is provided to the fuel electrode 78 of the fuel cell 77.

$$2CO + O_2 \rightarrow 2CO_2 \tag{3}$$

The fuel cell 77 comprises a fuel electrode 78, an oxygen electrode 80, and an electrolyte membrane 79 which is held between the fuel electrode 78 and the oxygen electrode 80. At the fuel electrode 78, as shown in the electrochemical reaction formula (4), the hydrogen gas within the gas mixture which is provided from the carbon monoxide remover 76 is separated into hydrogen ions and electrons by the catalytic action of the fuel electrode 78. The hydrogen ions are conducted to the oxygen electrode 80 through the electrolyte membrane 79, and the fuel electrode 78 takes out the electrons. The air (oxygen) in which dusts are removed by the air pump 71 is sent to the oxygen electrode 80 from the oxygen outlet 10. Moreover, as shown in the electrochemical reaction formula (5), oxygen in the air, hydrogen ions which passed the electrolyte membrane 79, and the electrons react to generate water.

$$3H_2 \to 6H^+ + 6e^- \quad (4)$$

$$6H^+ + 3/2O_2 + 6e^- \to 3H_2O \quad (5)$$

As described above, the electric energy is generated due to the electrochemical reactions shown in (4) and (5) described above occurring in the fuel cell 77. Gaseous water is included in the product discharged from the fuel electrode 78. The water is separated from other products by the separator, and is sent to the liquid-sending pump 72 to be mixed with the liquid fuel. The liquid-sending pump 73 stops when the amount of water discharged from the oxygen electrode 80 becomes sufficient and is more than a predetermined amount. That is, water is not generated at the oxygen electrode 80 at startup when the liquid-sending pump 72 and the liquid-sending pump 73 are starting to activate. Therefore, the needed water is provided from the water containing pipe 11. After the activation, when the overall system becomes stable, water is generated sufficiently at the oxygen electrode 80. Therefore, the water is mixed with the liquid fuel and is provided to the vaporizer 74. Because water is included in the product which is discharged from the fuel electrode 78, the water can be provided to the vaporizer 74 by the liquid-sending pump 72.

In the device 70 shown in FIG. 5, the fuel cell 77 generates the electric energy from hydrogen and oxygen. However, a direct methanol method type fuel cell in which the fuel cell 77 generates an electric energy from fuel and oxygen can be used. In this case, the reformer 75 and the carbon monoxide remover 76 are not needed, and the gas mixture of the water and the fuel which are vaporized at the vaporizer 74 is provided to the oxygen electrode 80 of the fuel cell 77.

When using the liquid fuel cartridge 1 is used for other purposes, other liquid (for example, ink) can be filled instead of the liquid fuel 18, and other liquid (for example, ink) can be filled instead of water 13.

The entire disclosure of Japanese Patent Application No. Tokugan 2006-77145 filed on Mar. 20, 2006 including specification, claims, drawings and summary are incorporated herein by reference in its entirety as far as the national law of the states designated or elected in the international application permits the incorporated by reference.

Various typical embodiments are described above. However, the present invention is not limited to the above described embodiments. Therefore, the scope of the present invention is only limited by the claims.

The invention claimed is:

1. A liquid cartridge, comprising:
   a vessel body for containing liquid, the vessel body comprising a plurality of surfaces;
   an oxygen outlet provided on one surface among the plurality of surfaces of the vessel body; and
   an oxygen input provided on a surface other than a furthest surface from the surface on which the oxygen outlet is provided among the plurality of surfaces of the vessel body,
   wherein the liquid contained in the vessel body includes water, and
   wherein a water outlet for discharging the water contained in the vessel body is provided on the surface on which the oxygen outlet is provided.

2. The liquid cartridge according to claim 1, wherein an oxygen flowing space is provided between the oxygen inlet and the oxygen outlet, and
   wherein the liquid cartridge further comprises an air filter to capture dust included in air which is taken in.

3. The liquid cartridge according to claim 1, wherein the oxygen inlet is provided on the surface on which the oxygen outlet is provided.

4. The liquid cartridge according to claim 1, wherein the liquid which is contained in the vessel body includes liquid fuel, and
   wherein a fuel outlet for discharging the liquid fuel contained in the vessel body is provided on the surface on which the oxygen outlet is provided.

5. A liquid cartridge, comprising:
   a vessel body for containing liquid, the vessel body comprising a plurality of surfaces;
   an oxygen outlet provided on one surface among the plurality of surfaces of the vessel body; and
   an oxygen input provided on a surface other than a furthest surface from the surface on which the oxygen outlet is provided among the plurality of surfaces of the vessel body;
   wherein liquid fuel and water are contained in the vessel body, the liquid fuel and the water being separated from each other, and
   wherein a fuel outlet for discharging the liquid fuel contained in the vessel body and a water outlet for discharging the water contained in the vessel body are provided on the surface on which the oxygen outlet is provided.

6. A liquid cartridge, comprising:
   a vessel body for containing liquid, the vessel body comprising a plurality of surfaces;
   an oxygen outlet provided on one surface among the plurality of surfaces of the vessel body;
   an oxygen input provided on a surface other than a furthest surface from the surface on which the oxygen outlet is provided among the plurality of surfaces of the vessel body; and
   a water containing pipe which is disposed inside the vessel body.

7. A liquid cartridge, comprising:
   a vessel body for containing liquid, the vessel body comprising a plurality of surfaces;
   an oxygen outlet provided on one surface among the plurality of surfaces of the vessel body;
   an oxygen input provided on a surface other than a furthest surface from the surface on which the oxygen outlet is provided among the plurality of surfaces of the vessel body; and
   a water containing pipe which is disposed inside the vessel body,
   wherein liquid fuel is contained at a periphery of the water containing pipe.

8. The liquid cartridge according to claim 1, wherein a pressure regulating hole is provided on at least one of the plurality of surfaces of the vessel body.

9. A liquid cartridge, comprising:
   a vessel body for containing liquid, the vessel body comprising a plurality of surfaces;
   an oxygen outlet provided on one surface among the plurality of surfaces of the vessel body; and an oxygen input provided on a surface other than a furthest surface from the surface on which the oxygen outlet is provided among the plurality of surfaces of the vessel body, wherein a liquid fuel containing space for containing liquid fuel is provided inside the vessel body, and wherein the liquid cartridge further comprises a follower partition plate which is provided in the liquid fuel containing space.

* * * * *